US006806441B2

United States Patent
Fidalgo

(12) United States Patent
(10) Patent No.: US 6,806,441 B2
(45) Date of Patent: Oct. 19, 2004

(54) PROCESS FOR LASER-CUTTING PARTS AND REMOVING FLASHING

(75) Inventor: Diamantino Manuel Fidalgo, Acushnet, MA (US)

(73) Assignee: Polyneer, Inc., New Bedford, MA (US)

( * ) Notice: Subject to any disclaimer, the term of this patent is extended or adjusted under 35 U.S.C. 154(b) by 0 days.

(21) Appl. No.: 10/065,162

(22) Filed: Sep. 23, 2002

(65) Prior Publication Data

US 2003/0057194 A1 Mar. 27, 2003

Related U.S. Application Data

(60) Provisional application No. 60/324,496, filed on Sep. 24, 2001.

(51) Int. Cl.$^7$ ............................................. B23K 26/38
(52) U.S. Cl. .............................................. 219/121.72
(58) Field of Search ................... 219/121.67, 121.68, 219/121.69, 121.7, 121.71, 121.78, 121.79, 121.8, 121.83, 121.72, 121.85; 264/400

(56) References Cited

U.S. PATENT DOCUMENTS 4,933,205 A * 6/1990 Duley et al. ................. 427/555
6,201,214 B1 * 3/2001 Duffin .................... 219/121.71
6,559,196 B2 * 5/2003 Narayan et al. ............ 521/174

\* cited by examiner

*Primary Examiner*—Kiley Stoner
*Assistant Examiner*—Jonathan Johnson
(74) *Attorney, Agent, or Firm*—Barlow, Josephs & Holmes, Ltd.

(57) ABSTRACT

The present invention relates to a laser-cutting method and system for processing shaped articles such as O-rings, seals, and gaskets. The article can be a polymeric material such as a rubber or elastomeric material. A web material having a shaped pattern of an article on its surface is provided. A laser beam is directed along the shaped pattern to cut the article from the web and trim away any flashing. The resulting cut article has a surface substantially free of any flashing, burrs, or other excess materials. Camera optical and positioning systems can be used with the laser system.

9 Claims, 4 Drawing Sheets

PROCESS FOR LASER-CUTTING PARTS AND REMOVING FLASHING

CROSS REFERENCE TO RELATED APPLICATIONS

This application is related to and claims the benefit of U.S. Provisional Patent Application No. 60/324,496 filed Sep. 24, 2001.

BACKGROUND OF THE INVENTION

The present invention relates generally to a laser-cutting method for processing parts such as O-rings, seals, and gaskets. Particularly, the invention relates to a laser-cutting process for cutting a shaped article and trimming flashing away from the article. The article can be a polymeric material such as a rubber or elastomeric material.

There are many conventional processes used for shaping articles such as O-rings, seals, gaskets, and other machine parts. These shaping processes include molding, machining, and forging operations. Various materials, such as polymers, ceramics, and metals, can be molded into articles for different applications. However, a problem with conventional shaping processes is that the final shaped article often has rough edges and surfaces. These rough edges and surfaces may contain excess material in the form of flashing or burrs. Particularly, molding processes leave the article with parting lines and burred edges. For example, in a typical rubber injection-molding processes, rubber is forced into a mold under pressure. The mold is made from two molding members joined together. The molded article, once removed from the mold, has parting lines and excess rubber material (flashing) on its surface. The molded article must be subjected to a finishing process to remove the flashing. This finishing process is referred to as de-flashing or de-burring.

Current methods of de-flashing and de-burring excess, fringe material from a shaped article including cryogenic de-flashing, manual trimming, and mass media tumbling. These methods are somewhat effective, but they require additional steps such as washing and drying to remove tumbling solvents or waste materials.

Accordingly, there is a need for an improved method and system of processing articles, where no further labor, tooling, or machining is needed to produce the final shape of the article. Particularly, there is a need to precisely shape polymeric articles such as rubber and other elastomeric materials. The present invention provides such a process and system.

SUMMARY OF THE INVENTION

The present invention relates to a process for laser-cutting shaped articles from a web material. By the term, "web material" as used herein, it is meant any material having at least one pattern of a shaped article on its surface and containing fringe material surrounding the shaped article such that the shaped article needs to be cut trimmed from the material. The fringe material may completely or partially surround the shaped article. As illustrated and described herein, the webbing is in the form of a sheet material containing multiple shaped patterns. However, it is understood that the webbing can be in any form. For example, the webbing can be a "loose" piece of material having a single shaped pattern and fringe material that needs to be cut and trimmed. In another example, the webbing can be in the form of a "strip" of material having a single shaped pattern or multiple shaped patterns on its surface. A laser beam is directed along the shaped pattern to cut the article from the webbing and trim away any flashing. The resulting cut article has a surface substantially free of any flashing.

The web material is preferably a polymeric material. Suitable polymeric materials include, for example, materials made from a polymer selected from the group consisting of polycarbonates, polyolefins, acrylics, vinyls, polyesters, and elastomers.

The material can be a rubber or elastomeric material. Suitable elastomeric polymers include, for example, styrene-butadiene copolymers, polychloroprene, ethylene-propylene copolymers, silicones, and polyurethanes. Alternatively, metallic and ceramic materials can be used. As illustrated and described herein, the article is in the shape of an O-ring. However, it is understood that the process and system of this invention can be used to process any shaped article including, for example, gaskets, seals, and the like.

In one embodiment, the process involves positioning the webbing on a staging platform; using a camera optical system to locate the shaped pattern on the webbing;

and directing a laser beam along the shaped pattern to cut the article from the webbing. The resulting cut article has a surface substantially free of any flashing.

A gantry or X-Y positioning system can be used to position the webbing and direct the laser beam.

BRIEF DESCRIPTION OF DRAWINGS

The novel features characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION

The present invention relates generally to a laser-cutting process for processing parts such as O-rings, seals, gaskets, and the like. A web material having a surface containing at least one shaped pattern of an article is provided. For example, the webbing may be a sheet material may have a surface containing multiple shaped patterns of O-ring articles. A laser beam is directed along the shaped pattern in order to cut the article and trim "flashing" from the article. By the term, "flashing", as used herein, it is meant any excess, fringe material along the surface of the article such as burrs, ridges, or other rough areas. The resulting article is characterized by having a surface substantially free of any flashing. The resulting article is net-shaped laser cut meaning that the final shape of the article is determined by the shape of the pattern on the sheet material. The cut articles produced by the process of this invention are ready for use. No further de-flashing, de-burring, or other machine tooling is required to remove flashing and smooth out the surfaces and edges of the article.

Figure 1:
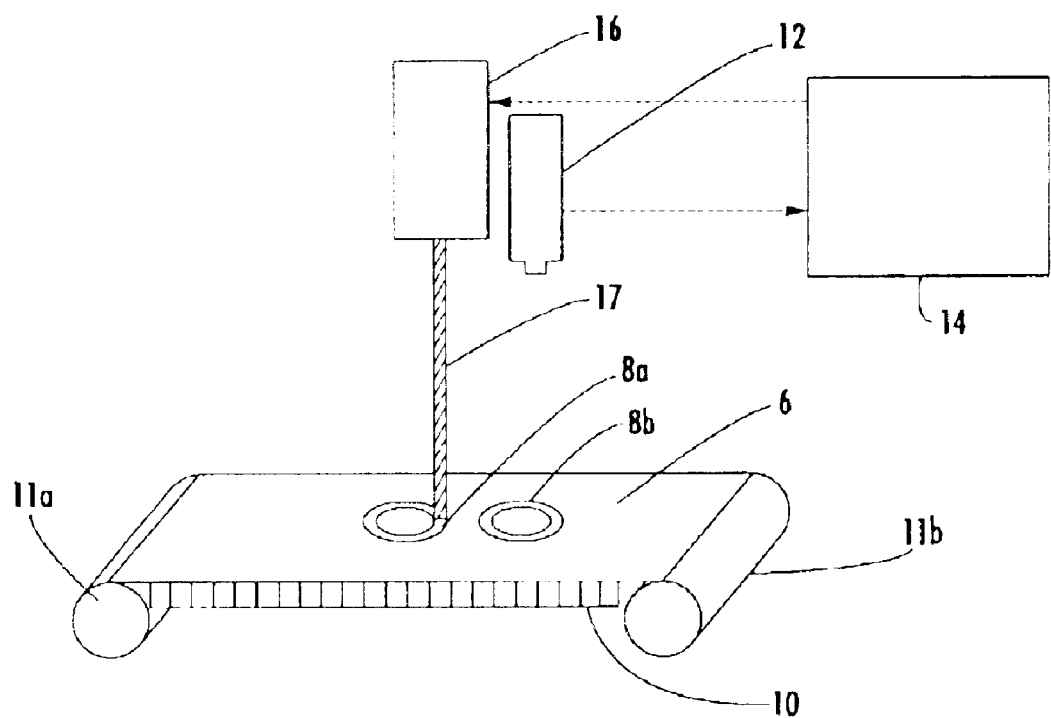
FIG. 1 is a schematic view of a process for laser-cutting a sheet material in accordance with the present invention.

The laser system can be part of an integrated system or it can be a stand alone system. Referring to FIG. 1, a sheet material 6 containing shaped patterns of articles 8a and 8b that will be cut from the sheet 6 is shown. (Shaped patterns of articles 8c and 8d are not shown.) The sheet material 6 may be positioned on a platform 10. Any suitable handling system for the sheet material 6 can be used. For example, the sheet may be rolled onto the platform 10 by rollers 11a and 11b. An optical sensor system 12 can be used to locate the shaped articles 8a and 8b on the sheet material 6 and provide this information to a computer system 14 that controls the operation of the laser 16. The article 8a is shown being irradiated with a laser beam 17.

Figure 2:
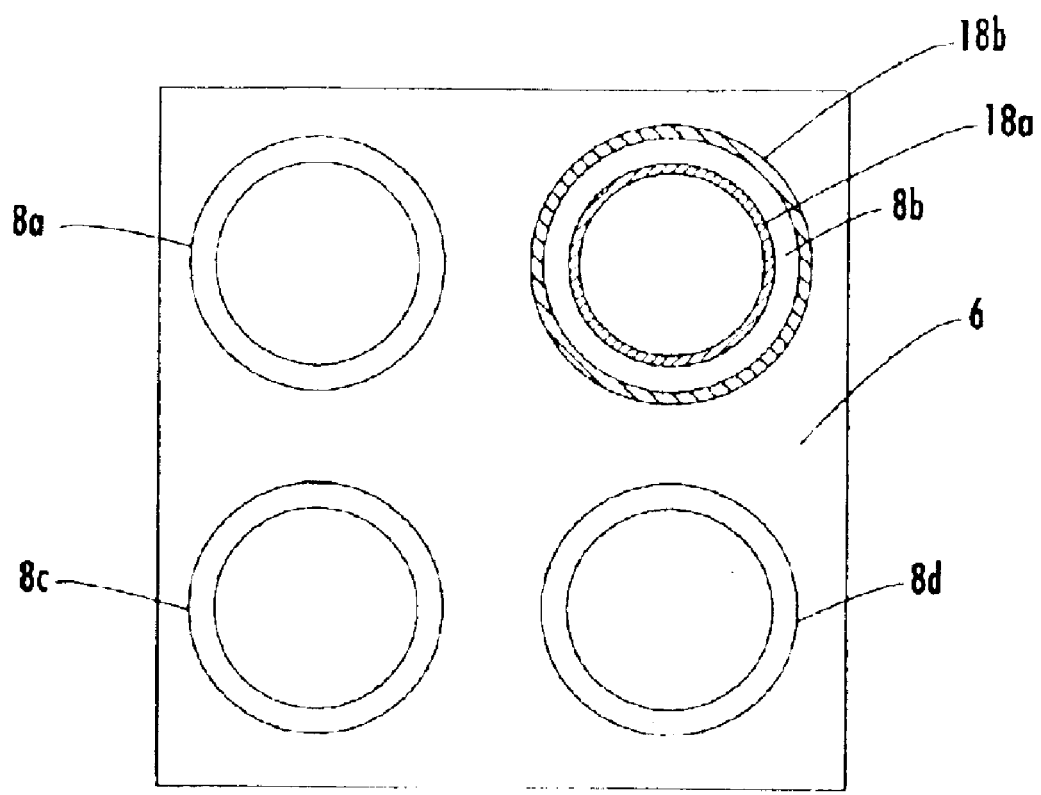
FIG. 2 is a planar view of the sheet material in FIG. 1.

FIG. 2. shows a top-view of the sheet material 6 containing shaped articles 8a, 8b, 8c, and 8d that will be laser cut. In FIG. 2, the articles 8a, 8b, 8c, and 8d are in the shape of O-rings. As previously discussed, the illustrated example is an O-ring article.

However, it is understood that the process of this invention is applicable to other types of shaped articles as well. The laser 16 cuts the articles 8a, 8b, 8c, and 8d from the sheet 6 and trims away any flashing. Referring to O-ring article 8b, the laser 16 cuts precisely along inner cutting path 18a and outer cutting path 18b.

As shown in FIG. 2, each O-ring article 8a, 8b, 8c, and 8d has an inner circle segment and a surrounding outer circle segment. The laser 16 may cut each of the articles 8a, 8b, 8c, and 8d according to the following sequence as illustrated for article 8b. First, the laser 16 cuts the inner circle segment and trims away flashing along the cutting path 18a. The O-ring article 8b remains attached to the web material (sheet) 6 after this first cutting and trimming step. Second, the laser 16 cuts the outer circle segment and trims away flashing along path 18b, thereby removing the article 8b from the sheet material 6.

The sheet material 6 can have any suitable composition. For example, polymeric sheet materials made from polymers such as polycarbonates, polyolefins, acrylics, vinyls, polyesters, and elastomers can be used. The material can be a rubber or elastomeric material. Suitable elastomeric polymers include, for example, styrene-butadiene copolymers, polychloroprene, ethylene-propylene copolymers, silicones, and polyurethane rubbers. Alternatively, hard metallic and ceramic materials such as aluminum, copper, diamond, brass, carbon, silicon nitride, aluminum nitride, boron nitride, glass, graphite, and the like can be used.

As previously discussed, the webbing is illustrated herein as being in the form of a sheet material. However, it is understood that the process of this invention is applicable to other types of web materials having a shaped pattern of an article on its surface and excess, fringe material that needs to be cut. The laser system can be any commercially available system capable of cutting through-the web material. For example, a $CO_2$ laser can be used in the process.

The laser 16 operates by directing a beam 17 of photons having extremely high energy onto the sheet material 6. The articles 8a, 8b, 8c, and 8d are cut from the sheet 6 by burning, melting or vaporizing away the material that comprises the sheet 6. Some sheet materials 6 have light energy absorption properties that correspond better with wavelengths emitted from certain lasers 16. Certain compositions will absorb light energy more efficiently at certain wavelengths. If energy absorption is high, more of the material can be cut and removed from the sheet 6. For example, many polymeric compositions have absorption bands in the infrared region that coincide with wavelengths emitted from a $CO_2$ laser. A 50 Watt $CO_2$ laser can be used to completely cut through polymeric materials having a thickness of 1/16 inch.

Laser beam properties such as wavelength, pulse energy, pulse frequency, focal point of the beam, and the like can be adjusted to deliver the most power to the surface of the sheet material 6 so that the beam 17 cuts the article in a shaped pattern in accordance with this invention. The laser beam 17 cuts through the sheet material 6 and trims away any flash, burrs, or other excess material. The laser beam 17 may only need to irradiate a selected area of the sheet 6 in a single pass or multiple passes may be needed in order to completely cut through the material and trim away the flashing.

The laser system can be assisted by optical inspection equipment 12 and/or positioning equipment to locate the desired articles that need to be cut and the areas that need to be de-burred or de-flashed. This laser system is useful in instances where there are multiple articles being processed or where the articles are not consistently located in the same orientation on the sheet. Alternatively, the laser system can be programmed to follow a specific cutting path and trimming area. This programmed laser system require part holders for consistent placement of the parts the work area.

Figure 3:
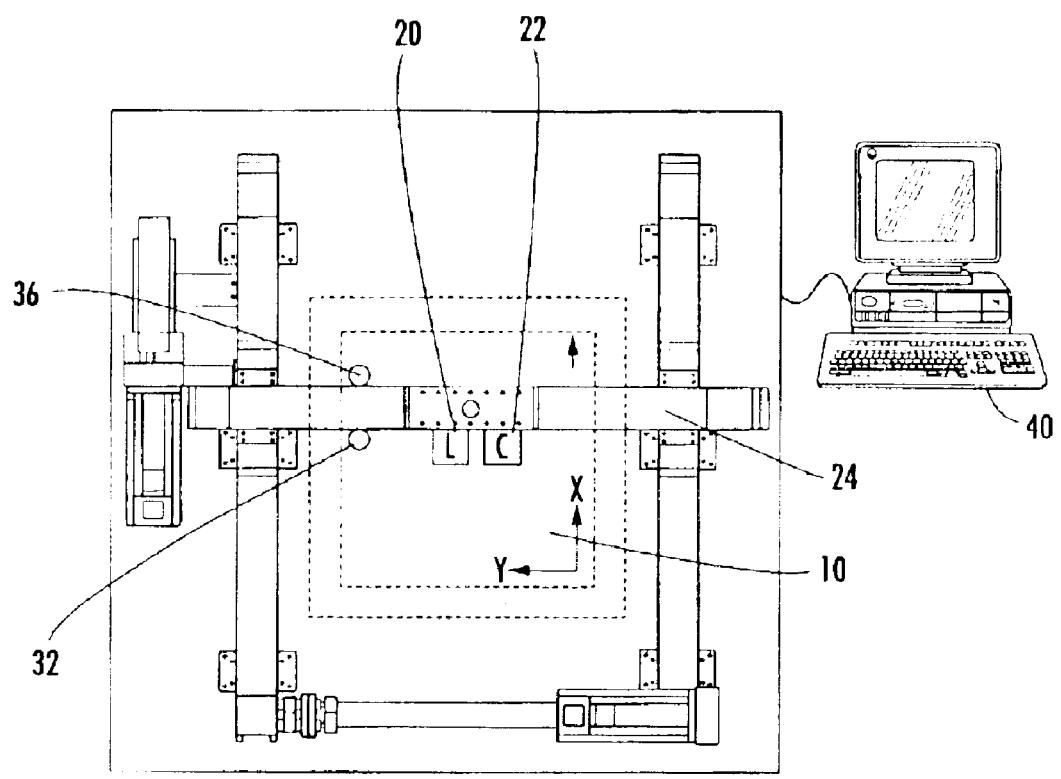
FIG. 3 is a schematic top-view of a process for laser-cutting a sheet material using a gantry style positioning system in accordance with the present invention.

With an optical system, the laser is guided to the starting point for cutting. The optical system includes one or more cameras and software algorithms to detect the article and determine the area to remove the flashing. For large working areas, where the article is greater than the laser system's focal range, the optional positioning system moves the article under the camera and laser. FIG. 3 shows a Gantry system, where the laser 20 and camera optics 22 are mounted on an overhead platform 24. The sheet material 6 remains stationary and the laser 20 and camera 22 optical systems move over the sheet material 6.

Figure 4:
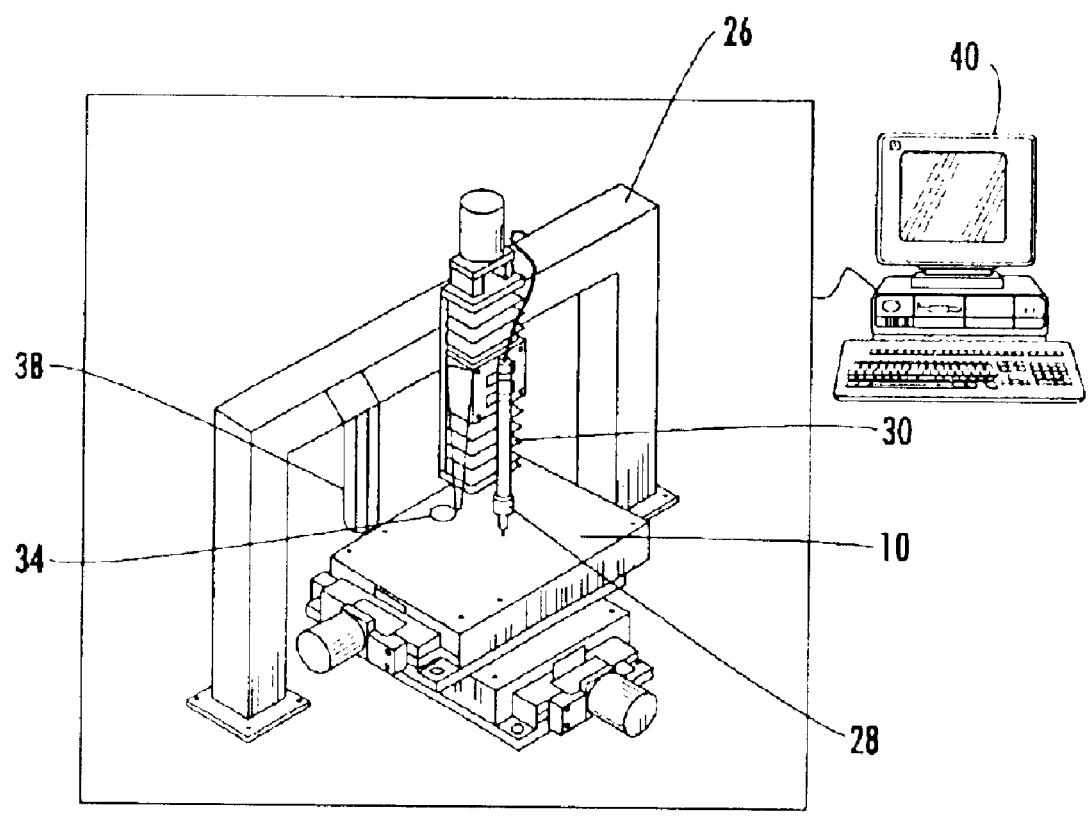
FIG. 4 is a schematic view of a process for laser-cutting a sheet material using a X-Y positioning system in accordance with the present invention.

FIG. 4 shows a X-Y or X-Y-Theta system, where the platform 26 is moved in the x-y direction and the laser 28 and camera optics 30 are stationary.

The laser systems can also have an automatic sheet feed assembly (not shown), such that manual placement of the sheet is not necessary. Further, the laser systems can have a pick-and-place device 32 (FIG. 3) and 34 (FIG. 4) such that the finished article can be picked up and placed in a processed bin. In addition, the laser system can include a rubbish removal assembly 36 (FIG. 3) and 38 (FIG. 4) to vacuum flashing and other resulting debris produced from the cutting operation.

In general, the laser-cutting cycle, as illustrated in FIGS. 3 and 4, comprise the following steps: a) manually or automatically placing the sheet material under the camera/laser; b) using the camera optical system for locating the articles to be cut and identifying the areas where flashing is to be removed; c) positioning the laser over the areas to cut for a gantry system (or positioning the areas under the laser for a X-Y system); d) laser-cutting the shaped article and trimming flashing from the article; e) manually removing or picking-up the article by a pick-and-place system; and f) manually removing or picking-up the flash by a rubbish removal system.

As shown in FIGS. 3 and 4, all of the component systems (laser, optical, and positioning systems) are controlled via one or more computers 40. The computer is the interface that runs the component systems via software modules. The entire laser system can comprise one or more computers to control the process. Other computer systems can be used to increase throughput, for example, a computer can be used solely to run the optical system since "vision" algorithms are typically time consuming. While the optical computer system is running the processing algorithms, another computer can be moving the positioning stage simultaneously, thus reducing time. All computers are internally networked such that they communicate within themselves. The above-described laser-cutting cycle is described in more detail as follows.

The sheet material is placed on the staging platform under the laser/camera. The physical act of placing the sheet material can be done manually or via a part handling system. The optional sheet handling system rolls the material onto the processing stage. The material is then held on the processing stage by gravitational force.

One or more optical sensors detects the sheet material and instructs the system to start processing the material. The optical system is preferably pre-loaded with a description of the article (part) including shape and dimensions. This part description is in a computer file loaded onto the computer program currently performing the system tasks.

The optical system then uses "vision" algorithms to detect the part as described by the system. One or more algorithms can be used to detect the part such as edge detection, blob detection, shape correlation algorithms, and the likeUpon detecting the shaped part and the areas to cut, the optical system instructs the laser to start cutting at specific locations. The optical system further instructs the laser as to the shape and size of the cut. For a sheet material containing multiple shaped parts, the positioning system moves onto the next part location according to a pre-defined part profile that is pre-loaded onto the system as described above, and the part is again processed until all parts are cut.

Once all parts are cut, the parts can be manually removed or the optional pick-and-place system will remove them. For the latter part removal method, the positioning system moves to a locations where a part was processed and instructs the optical system to detect the part. When the part is detected, the positioning system moves under the pick-and-place nozzle and the part is sucked out of the processing stage and placed into a processed bin. This process is repeated until all parts are removed.

After removing the parts, the processing stage can be manually cleaned of the resulting debris, or the rubbish removal system can automatically perform the same task. The rubbish removal system uses a vacuum to suck-up debris produced by the cutting operation. This automatic function is performed near the processing stage or the vacuum moving over the entire processing area.

The above-described laser systems are based on an "open architecture" model such that other hardware or software systems can be easily integrated for further automation.

The laser-cutting process of the present invention provides many benefits. For instance, 1) the process removes all flashing without damaging the shaped article; 2) the process can be fully automated; 3) the process produces a finished article that does not require additional processing or tooling; 4) the process can employ optical detection and positioning systems to ensure precise laser-cutting; and 5) the process can employ pick-and-place and rubbish removal systems.

It is appreciated by those skilled in the art that various changes and modifications can be made to the illustrated embodiments without departing from the spirit of the invention. All such modifications and changes are intended to be covered by the appended claims.

What is claimed is:

1. A process for laser-cutting a polymeric web material having molded articles, comprising the steps of:
   a) providing a polymeric web material having a surface, said surface having at least one molded article;
   b) positioning the web material on a staging platform;
   c) using a camera optical system to locate the molded article on the web material and distinguish the molded article from flashing that surrounds the article; and
   d) using the camera optical system to direct a laser beam along the molded article during a cutting process so that the beam cuts completely through the web flashing and produces a cut-out article having a surface substantially free of flashing.

2. The process of claim 1, wherein the surface of the web material has multiple molded articles.

3. The process of claim 2, wherein the molded articles are in the form of O-rings.

4. The process of claim 1, wherein the web material is in the form of a sheet.

5. The process of claim 4, wherein the polymeric sheet comprises a polymer selected from the group consisting of polycarbonates, polyolefins, acrylics, vinyls, polyesters, and elastomers.

6. The process of claim 4, wherein the polymeric sheet is an elastomeric sheet comprising an elastomeric polymer selected from the group consisting of styrene-butadiene copolymers, polychloroprene, ethylene-propylene copolymers, silicones, and polyurethanes.

7. The process of claim 1, wherein a gantry system is used to position the web material and direct the laser beam.

8. The process of claim 1, wherein a X-Y positioning system is used to position the web material and direct the laser beam.

9. The process of claim 1, wherein the camera optical system and laser beam are controlled by a computer.

* * * * *